(12) United States Patent
Nakabayashi et al.

(10) Patent No.: US 11,552,356 B2
(45) Date of Patent: Jan. 10, 2023

(54) ELECTRICITY STORAGE DEVICE MEMBER, METHOD OF MANUFACTURING THE SAME, AND ELECTRICITY STORAGE DEVICE

(71) Applicants: Sumitomo Electric Fine Polymer, Inc., Osaka (JP); TOYOTA JIDOSHA KABUSHIKI KAISHA, Toyota (JP)

(72) Inventors: Makoto Nakabayashi, Osaka (JP); Hong-Phuc Nguyen, Osaka (JP); Keiji Kaita, Toyota (JP); Motoyoshi Okumura, Toyota (JP); Takuro Kikuchi, Toyota (JP)

(73) Assignees: Sumitomo Electric Fine Polymer, Inc., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 16/617,816

(22) PCT Filed: Mar. 20, 2018

(86) PCT No.: PCT/JP2018/010949
§ 371 (c)(1),
(2) Date: Nov. 27, 2019

(87) PCT Pub. No.: WO2018/220954
PCT Pub. Date: Dec. 6, 2018

(65) Prior Publication Data
US 2020/0119317 A1 Apr. 16, 2020

(30) Foreign Application Priority Data
Jun. 2, 2017 (JP) .............................. JP2017-110096

(51) Int. Cl.
*H01M 4/02* (2006.01)
*H01M 50/124* (2021.01)
(Continued)

(52) U.S. Cl.
CPC ........... *H01M 50/124* (2021.01); *B32B 15/08* (2013.01); *H01G 11/80* (2013.01); *H01M 4/02* (2013.01);
(Continued)

(58) Field of Classification Search
CPC ....................................................... H01M 4/02
See application file for complete search history.

(56) References Cited

U.S. PATENT DOCUMENTS

2013/0199828 A1* 8/2013 Nakabayashi ......... H05K 1/024
174/257
2013/0224568 A1 8/2013 Fukunaga et al.
(Continued)

FOREIGN PATENT DOCUMENTS

EP 02905837 A1 8/2015
JP 2001-148234 A 5/2001
(Continued)

*Primary Examiner* — Jacob B Marks
(74) *Attorney, Agent, or Firm* — Faegre Drinker Biddle & Reath LLP (57) ABSTRACT

An electricity storage device member is provided. The electricity storage device member includes a base material mainly composed of a metal and a resin layer stacked on the base material, in which the resin layer contains a crosslinked fluororesin.

12 Claims, 4 Drawing Sheets

(51) Int. Cl.
*B32B 15/08* (2006.01)
*H01G 11/80* (2013.01)
*H01M 50/172* (2021.01)

(52) U.S. Cl.
CPC ..... *H01M 50/1245* (2021.01); *H01M 50/172* (2021.01); *H01M 2004/027* (2013.01); *H01M 2004/028* (2013.01)

(56) References Cited

U.S. PATENT DOCUMENTS

2017/0331115 A1* 11/2017 Saito .................. C08F 14/185
2018/0019449 A1    1/2018 Maeda

FOREIGN PATENT DOCUMENTS

| | | |
|---|---|---|
| JP | 2002-75297 A | 3/2002 |
| JP | 2005-166738 A | 6/2005 |
| JP | 2005-166978 A | 6/2005 |
| JP | 2005-259391 A | 9/2005 |
| JP | 2007-95406 A | 4/2007 |
| JP | 2007-294382 A | 11/2007 |
| JP | 2009-123401 A | 6/2009 |
| JP | 2010-92631 A | 4/2010 |
| JP | 2012-109198 A | 6/2012 |
| JP | 2014-17175 A | 1/2014 |
| JP | 2014-211994 A | 11/2014 |
| JP | 2016-81856 A | 5/2016 |
| JP | 2017-59402 A | 3/2017 |
| WO | WO 2012/008414 A1 | 1/2012 |
| WO | WO 2016-158997 * | 10/2016 |
| WO | WO-2016/158997 A1 | 10/2016 |

* cited by examiner

ELECTRICITY STORAGE DEVICE MEMBER, METHOD OF MANUFACTURING THE SAME, AND ELECTRICITY STORAGE DEVICE

TECHNICAL FIELD

The present invention relates to an electricity storage device member, a method of manufacturing the same, and an electricity storage device. The present application claims priority to Japanese Patent Application No. 2017-110096 filed on Jun. 2, 2017, the disclosure of which is hereby incorporated by reference in its entirety.

BACKGROUND ART

Lithium-ion secondary batteries have been used as a power source of an electronic device. In addition to secondary batteries, other electricity storage devices such as electric double-layer capacitors have also been developed. A secondary battery, for instance, typically includes a pouch-shaped housing made of aluminum laminate film and/or the like, an electrode group composed of a positive electrode, a negative electrode, and the like accommodated in the housing, and a tab lead extending from inside the housing to the outside (see PTL 1).

The tab lead is mainly composed of a metal base material responsible for transferring electric power between the positive electrode or the negative electrode of the electrode group and an external component. Typically, the pouch-shaped housing also includes a metal base material in a film form. For the purpose of electrically insulating the base material of the housing from the base material of the tab lead, resin layers are disposed on these two base materials respectively and these two base materials are bonded to each other with the resin layers being present therebetween. The presence of these resin layers also makes it possible to seal the electrode group within the pouch-shaped housing.

Typically, these resin layers are made of a polyolefin such as polypropylene. These resin layers are required to be adhered to the metal base materials sufficiently. However, a polyolefin, for example, is poorly adhesive to metal. Therefore, in the tab lead or the like, an acid-modified polyolefin is typically interposed between the base material and the polyolefin resin layer when they are stacked on top of one another.

CITATION LIST

Patent Literature

PTL 1: Japanese Patent Laying-Open No. 2014-017175

SUMMARY OF INVENTION

The present invention is devised for solving the above-described problem. An aspect of the present invention is an electricity storage device member including a base material mainly composed of a metal and a resin layer stacked on the base material, in which the resin layer contains a crosslinked fluororesin.

Another aspect of the present invention is a method of manufacturing an electricity storage device member, in which the method includes stacking a layer containing a fluororesin on a base material mainly composed of a metal and applying ionizing radiation to the layer containing the fluororesin.

A further aspect of the present invention is an electricity storage device including a positive electrode, a negative electrode, an electrolyte solution, a housing accommodating the positive electrode, the negative electrode, and the electrolyte solution, and a tab lead having one end exposed from the housing and the other end connected to the positive electrode or the negative electrode, in which the housing and the tab lead are thermally bonded to each other and at least one of the housing and the tab lead is the above-described electricity storage device member.

DETAILED DESCRIPTION

Problem to be Solved by the Present Disclosure

The resin layer is required to have not only thermal bonding properties and adhesiveness with the base material but also chemical resistance, namely the durability to withstand the electrolyte solution, heat resistance, flame retardancy, and strength, for example. When the resin layer is poor in chemical resistance or heat resistance, unfavorable consequences may arise including susceptibility to electrolyte solution leakage from, for example, the thermally bonded interface or the interface between the base material and the resin layer. Along with the trend toward higher currents and higher voltages to be applied to electricity storage devices such as electricity storage devices for electric vehicles, demands for improvement in heat resistance and the like have been growing.

The present invention has been devised in light of the above-described circumstances. An object of the present invention is to provide an electricity storage device member having good heat resistance and good flame retardancy, a method of manufacturing the electricity storage device member, and an electricity storage device including the electricity storage device member.

Effect of the Present Disclosure

The present invention makes it possible to provide an electricity storage device member that includes a resin layer having good heat resistance and good flame retardancy, a method of manufacturing the electricity storage device member, and an electricity storage device including the electricity storage device member.

Description of Embodiments

An electricity storage device member according to an aspect of the present invention includes a base material mainly composed of a metal and a resin layer stacked on the base material, in which the resin layer contains a crosslinked fluororesin. The term "crosslinked" herein refers to a state in which a three-dimensional crosslinked structure is formed.

In the electricity storage device member that includes a resin layer containing a crosslinked fluororesin and thereby has good heat resistance and good chemical resistance, a liquid leakage is mitigated. In addition, this crosslinked fluororesin is excellent in flame retardancy. Thus, the electricity storage device member is excellent in the heat resistance and the flame retardancy of the resin layer, for instance, and is therefore suitable for use in electricity storage devices intended to be used at high temperatures and in harsh environments, such as electricity storage devices for electric vehicles. Moreover, an electricity storage device including the electricity storage device member is highly safe in an unpredictable abnormal circumstance such as heat generation. The phrase "mainly composed of (a component)" herein means that the content by mass of the component is the highest among all the components, preferably 50 mass % or higher.

In the electricity storage device member, it is preferable that a chemical bond be present between the fluororesin and a surface of the base material. This configuration may enhance adhesiveness between the base material and the resin layer and, thereby, upon an impact such as a falling impact, may mitigate liquid leakage and ensure safety. Moreover, neither roughening treatment of the base material nor use of an adhesive is required in manufacturing the electricity storage device member and, thereby, productivity may be enhanced. The "chemical bond" refers to any of a covalent bond, an ionic bond, and a hydrogen bond.

Preferably, the resin layer is a thermal bonding layer. With this configuration, excellent thermal bonding properties may be exhibited. The "thermal bonding layer" herein refers to a layer that is bonded to another resin layer upon thermal bonding treatment. Upon this thermal bonding treatment, the resin layer of the electricity storage device member, namely the thermal bonding layer, may soften to achieve thermal bonding; or the other resin layer to which the thermal bonding layer is to be made adhered may soften to achieve thermal bonding. In the latter case, the thermal bonding layer of the electricity storage device member may essentially remain un-softened upon thermal bonding.

Preferably, the resin layer contains a cloth or a filler and the resin layer has a linear thermal expansion coefficient ranging from $1\times10^{-7}$/K to $40\times10^{-6}$/K. This configuration in which the resin layer thus contains a cloth or a filler may decrease the linear thermal expansion coefficient and thereby bring the thermal expansion coefficient of the resin layer closer to the thermal expansion coefficient of the base material mainly composed of a metal. These phenomena mitigate strain caused by changes in temperature, for instance, and thereby may further enhance peel strength, more specifically, adhesiveness between layers. When the base material is made temporarily adhered to the resin layer containing a fluororesin by a technique such as pressing and then ionizing radiation is applied to the resultant for crosslinking, for instance, a very small gap may be formed between the base material and the resin layer prior to the ionizing radiation application due to the difference in linear thermal expansion coefficient. Instead, in the configuration in which the resin layer contains a filler or a cloth and thereby the thermal expansion coefficient of the resin layer is made closer to the thermal expansion coefficient of the base material as described above, formation of the gap due to the difference in linear thermal expansion coefficient may be mitigated. With the above-described configuration in which the resin layer thus contains a cloth or a filler, tensile strength at break and the like may be improved as well and thereby properties such as safety and durability may be enhanced. The "linear thermal expansion coefficient" herein refers to the increase in length of an object when the temperature is increased by 1° C. Herein employed is the average of the linear thermal expansion coefficients that are measured while the temperature is increased from 20° C. to 150° C. The "linear thermal expansion coefficient" may be measured in accordance with JIS-K-7197 (2012) "Testing method for linear thermal expansion coefficient of plastics by thermomechanical analysis".

It is preferable that the electricity storage device member further include a covering layer containing a fluororesin, the covering layer be stacked on the resin layer opposite the base material, and the fluororesin contained in the covering layer be either a non-crosslinked fluororesin or a fluororesin having a melting point lower than a melting point of the crosslinked fluororesin. With this configuration in which the covering layer containing a fluororesin is thus further included, good heat resistance and good flame retardancy may be retained and thermal bonding properties may be enhanced.

Preferably, the crosslinked fluororesin is tetrafluoroethylene-hexafluoropropylene copolymer (FEP). FEP has a low melting point and a high fluidity at about 300° C., compared to other fluororesins. Therefore, using FEP in the resin layer may allow the thermal bonding temperature to be lowered and the thermal bonding treatment duration to be shortened.

Preferably, the fluororesin contained in the covering layer is FEP. As described above, FEP is preferable among other fluororesins from the viewpoint of thermal bonding properties. Using FEP in the covering layer may allow the thermal bonding temperature to be lowered and the thermal bonding treatment duration to be shortened.

Preferably, the peel strength between the resin layer and the base material ranges from 0.1 N/cm to 100 N/cm. With the peel strength between the resin layer and the base material being 0.1 N/cm or higher, adhesiveness between the base material and the resin layer may be further enhanced. Moreover, the peel strength serves as a measure of the extent of crosslinking in the fluororesin in the resin layer. When the peel strength is 0.1 N/cm or higher, it indicates that crosslinking is formed to an extent appropriate for further enhancing heat resistance and chemical resistance. In addition, when the peel strength between the resin layer and the base material does not exceed 100 N/cm, it indicates that crosslinking is formed to such an extent that a moderate level of softening occurs upon heating to enhance thermal bonding properties. The "peel strength" herein refers to a peel strength obtained by a test method in accordance with JIS-K-6854-2 (1999) "Adhesives—Determination of peel strength of bonded assemblies—Part 2: 180° peel".

Preferably, a ten-point average roughness ($R_Z$) of the surface of the base material in a region on which the resin layer is stacked ranges from 0.001 μm to 10 μm. When the evenness of the surface of the base material in a region on which the resin layer is stacked is thus high, the thickness of the resin layer is uniform and thereby insulation breakdown and migration may be mitigated. In addition, thermal bonding properties and chemical resistance may also be enhanced. Furthermore, when the evenness of the surface of the base material is thus high, roughening treatment such as etching is not required and thereby productivity may be enhanced. The "ten-point average roughness (Rz)" herein refers to a value obtained by measurement in accordance with JIS-B-0601 (2001), with a cut-off wavelength (λc) of 2.5 mm and an evaluation length (l) of 12.5 mm.

Preferably, the electricity storage device member is a tab lead or a housing. When the electricity storage device member is used as a tab lead and/or a housing, advantages of the present invention including good heat resistance and good flame retardancy may be exhibited further effectively.

A method of manufacturing an electricity storage device member according to an aspect of the present invention includes stacking a layer containing a fluororesin on a base material mainly composed of a metal and applying ionizing radiation to the layer containing a fluororesin.

By the ionizing radiation, a crosslink may be formed in the fluororesin in the irradiated layer and a chemical bond may also be formed between the fluororesin and a metal and the like in the base material. Therefore, using this manufacturing method makes it possible to obtain an electricity storage device member that includes a resin layer having good heat resistance, good flame retardancy, and excellent adhesiveness with the base material.

An electricity storage device according to an aspect of the present invention includes a positive electrode, a negative electrode, an electrolyte solution, a housing accommodating the positive electrode, the negative electrode, and the electrolyte solution, and a tab lead having one end exposed from the housing and the other end connected to the positive electrode or the negative electrode, in which the housing and the tab lead are thermally bonded to each other and at least one of the housing and the tab lead is the above-described electricity storage device member.

In this electricity storage device in which at least one of the housing and the tab lead is the above-described electricity storage device member, the resin layer has good heat resistance and good flame retardancy. Therefore, this electricity storage device may be capable of, for instance, retaining its high quality even when used in harsh environments including high-temperature environments or when used at high voltages and high currents.

Preferably, the electricity storage device further includes a thermal bonding film interposed between the housing and the tab lead, in which the thermal bonding film contains either a non-crosslinked fluororesin or a fluororesin having a melting point lower than a melting point of the crosslinked fluororesin. In the electricity storage device in which the thermal bonding film containing either a non-crosslinked fluororesin or a fluororesin having a melting point lower than a melting point of the crosslinked fluororesin is thus interposed between the housing and the tab lead, thermal bonding properties may be enhanced.

DETAILED DESCRIPTION OF EMBODIMENTS

First Embodiment: Secondary Battery 10

Next, a detailed description will be given of a secondary battery as a first embodiment of the electricity storage device according to the present invention, with reference to the drawings as appropriate. A description will also be given of a housing and a tab lead of the secondary battery, as an embodiment of the electricity storage device member according to the present invention.

Figure 1:
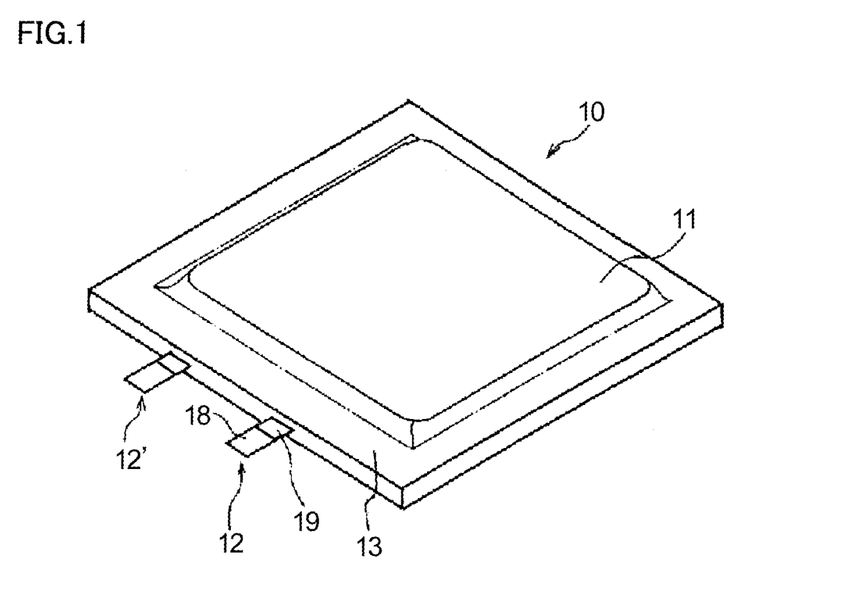
FIG. 1 is a perspective view of a secondary battery according to a first embodiment of the electricity storage device according to the present invention.
Figure 2:
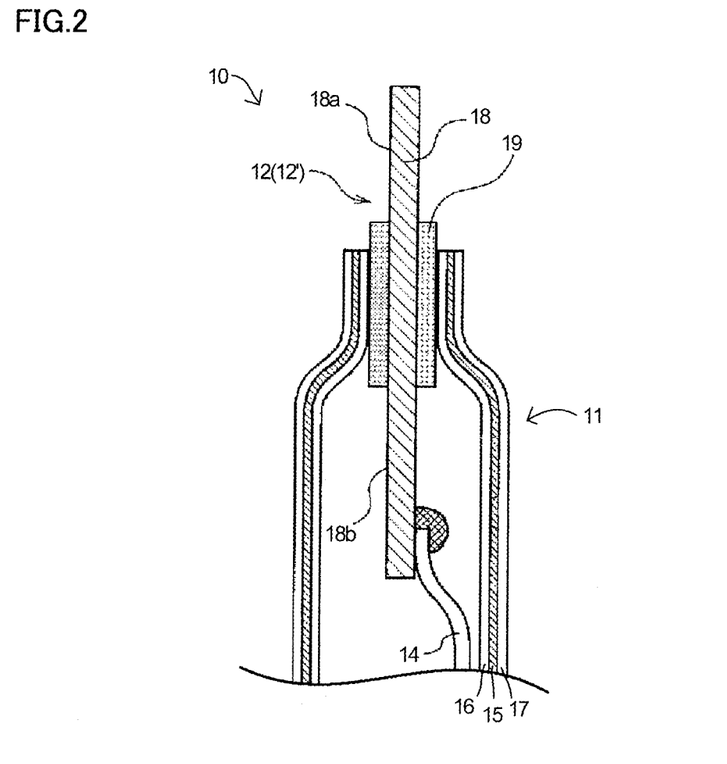
FIG. 2 is a partial sectional view of the secondary battery illustrated in FIG. 1.

A secondary battery 10, illustrated in FIGS. 1 and 2, includes a plate-like positive electrode, a plate-like negative electrode, and an electrolyte solution (any of these is not illustrated in the drawings), a housing 11, and a tab lead 12, 12'.

The positive electrode and the negative electrode (not illustrated) are stacked on top of one another with a separator interposed therebetween and, thus, they form a stacked electrode group. This stacked electrode group and the electrolyte solution are accommodated in housing 11 in a hermetically sealed manner. In housing 11, the stacked electrode group is immersed in the electrolyte solution. Housing 11 is made of a laminate film or laminate films, as described below. Two laminate films or one folded laminate film has seal portions 13 at the edges, and these seal portions 13 are thermally bonded to each other to achieve hermetic sealing. Tab lead 12 is disposed in such a way that one end thereof is exposed from housing 11 and the other end thereof is connected to the positive electrode accommodated in housing 11. Tab lead 12' is disposed in such a way that one end thereof is exposed from housing 11 and the other end thereof is connected to the negative electrode accommodated in housing 11. A middle portion of tab lead 12, 12' is sandwiched between the laminate films, which serve as housing 11. This middle portion is where tab lead 12, 12' is thermally bonded to housing 11.

Typically, each of the positive electrode and the negative electrode is a stacked body composed of the following: a current collector such as a metal foil; and an active material layer containing an active material, stacked on a surface of the current collector. The shape of each of the positive electrode and the negative electrode is typically a plate-like shape but may be a different shape.

The separator is typically an electrically insulating, porous sheet. The separator is impregnated with the electrolyte solution.

The electrolyte solution may be a non-aqueous solvent containing an electrolyte salt dissolved therein. Alternatively, the solvent in the electrolyte solution may be water.

(Housing 11)

Housing 11 as an embodiment of the electricity storage device member according to the present invention includes a base material 15, a resin layer 16 stacked on an interior side of base material 15, and an outer layer 17 stacked on an exterior side of base material 15, as illustrated in FIG. 2. In other words, housing 11 is a laminate film composed of resin layer 16, base material 15, and outer layer 17 stacked in this order. As described above, housing 11 is a hermetically sealed container accommodating the positive electrode, the negative electrode, the separator, and the electrolyte solution.

Base material 15 has a film form and is typically a metal foil. More specifically, base material 15 is mainly composed of a metal. Examples of the metal include aluminum, copper, and stainless steel. Base material 15 may consist essentially of metal but may contain an additive that is not a metal.

Preferably, the upper limit to the ten-point average roughness ($R_z$) of the interior side face of base material 15, more specifically, in a region on which resin layer 16 is stacked is 10 µm, more preferably 5 µm. With the arithmetic mean roughness (Ra) of the interior side face of base material 15 being equal to or lower than the upper limit, insulation breakdown and migration may be mitigated and thermal bonding properties and chemical resistance may be enhanced. Preferably, the lower limit to the arithmetic mean roughness (Ra) is 0.001 µm, more preferably 0.01 µm, further preferably 0.1 µm, further more preferably 0.3 µm. With the ten-point average roughness ($R_z$) of the interior side face of base material 15 being equal to or higher than the lower limit, adhesiveness with resin layer 16 may be enhanced, for instance.

Resin layer 16 is directly stacked on the interior side of base material 15. Resin layer 16 is a layer containing a crosslinked fluororesin. Resin layer 16 may contain an additional, optional component, in addition to the fluororesin. Resin layer 16 is a thermal bonding layer having thermal bonding properties.

The fluororesin refers to a resin in which at least one hydrogen atom bonded to a carbon atom in a main chain structural unit of the polymer chain is substituted with a fluorine atom or an organic group containing a fluorine atom (hereinafter, also called "fluorine-atom-containing group"). The fluorine-atom-containing group refers to a linear, branched, or cyclic organic group in which at least one of its hydrogen atoms is substituted with a fluorine atom. Examples of the fluorine-atom-containing group include a fluoroalkyl group, a fluoroalkoxy group, and a fluoropolyether group.

The "fluoroalkyl group" refers to an alkyl group in which at least one of its hydrogen atoms is substituted with a fluorine atom. A "perfluoroalkyl group" is also encompassed. More specifically, the "fluoroalkyl group" encompasses the following, for example: an alkyl group in which all of its hydrogen atoms are substituted with fluorine atoms; and an alkyl group in which all of its hydrogen atoms except one terminal hydrogen atom are substituted with fluorine atoms.

The "fluoroalkoxy group" refers to an alkoxy group in which at least one of its hydrogen atoms is substituted with a fluorine atom. A "perfluoroalkoxy group" is also encompassed. More specifically, the "fluoroalkoxy group" encompasses the following, for example: an alkoxy group in which all of its hydrogen atoms are substituted with fluorine atoms; and an alkoxy group in which all of its hydrogen atoms except one terminal hydrogen atom are substituted with fluorine atoms.

The "fluoropolyether group" refers to a monovalent group that has a plurality of alkylene oxide chains as its repeating unit and contains an alkyl group or a hydrogen atom at a terminus, in which at least one hydrogen atom in the alkylene oxide chain and/or in the terminal alkyl group or the terminal hydrogen atom is substituted with a fluorine atom. The "fluoropolyether group" encompasses a "perfluoropolyether group" that has a plurality of perfluoroalkylene oxide chains as its repeating unit.

The fluororesin is a polymer compound containing a fluorine atom within the molecule. Examples of the fluororesin include tetrafluoroethylene-hexafluoropropylene copolymer (FEP), tetrafluoroethylene-(perfluoroalkyl vinyl ether) copolymer (PFA), polytetrafluoroethylene (PTFE), tetrafluoroethylene-perfluorodioxole copolymer (TFE/PDD), polychlorotrifluoroethylene (PCTFE), chlorotrifluoroethylene-ethylene copolymer (ECTFE), polyvinylidene fluoride (PVDF), polyvinyl fluoride (PVF), (vinylidene fluoride)-hexafluoropropylene copolymer (VDF-HFP copolymer), and (vinylidene fluoride)-hexafluoropropylene-tetrafluoroethylene copolymer (VDF-HFP-TFE copolymer). Among these fluororesins, tetrafluoroethylene-hexafluoropropylene copolymer (FEP), tetrafluoroethylene-(perfluoroalkyl vinyl ether) copolymer (PFA), polytetrafluoroethylene (PTFE), and tetrafluoroethylene-perfluorodioxole copolymer (TFE/PDD) are preferable and FEP is more preferable. Using FEP may enhance thermal bonding properties as described above, for instance. One type of these fluororesins may be used, or two or more types of these fluororesins may be used as a mixture.

The fluororesin in resin layer 16 contains a crosslink. More specifically, it is preferable that a carbon atom in the main chain of the fluororesin be bonded with another carbon atom in the main chain of the fluororesin via a covalent bond. When the fluororesin thus contains a crosslink, good chemical resistance and good heat resistance may be exhibited.

In housing 11, it is preferable that a chemical bond be present between the fluororesin in resin layer 16 and a surface of base material 15. More specifically, it is preferable that a carbon atom in the main chain of the fluororesin be bonded with an atom on a surface of base material 15 via a covalent bond or an ionic bond. The atom on a surface of base material 15 may be a metal atom that is a main component of base material 15 or a different atom. Resin layer 16 may contain a coupling agent, and the fluororesin may be chemically bonded with an atom on a surface of base material 15 via the coupling agent.

The presence of a chemical bond between the fluororesin and the base material may be identified by X-ray photoelectron spectrometry (XPS), also known as Electron Spectroscopy for Chemical Analysis (ESCA), for example. X-ray photoelectron spectrometry involves measuring energy distribution of photoelectrons released from a sample upon X-ray irradiation and then subtracting the resulting numerical value from the value of energy of the applied X-ray to calculate the bound energy of the electrons. The value of bound energy of electrons is inherent to the element(s) and to the state of electrons therein, for example, and, therefore, from this value, the element(s) and the presence of a chemical bond in the sample may be identified. Using a hard X-ray such as spring-8, in particular, allows analysis of as deep as about 20 nm and, therefore, enables analysis of a chemical bond at the interface.

Preferably, the crosslinked fluororesin in resin layer 16 has a melting point ranging from 250° C. to 350° C., for example. With the melting point of the fluororesin being within this range, both good thermal bonding properties and good heat resistance may be obtained, for instance.

Forming a crosslink in the fluororesin in resin layer 16 and forming a chemical bond between the resulting fluororesin and a surface of base material 15 may be carried out by generating fluorine radicals with, for example, application of ionizing radiation in an oxygen-free environment or while the fluororesin is in a melted state. The technique of ionizing radiation application will be described below in the section regarding a manufacturing method.

Preferably, the lower limit to the peel strength between resin layer 16 and base material 15 is 0.1 N/cm, more preferably 0.3 N/cm, further preferably 1 N/cm, further more preferably 5 N/cm, further more preferably 10 N/cm. With the peel strength between resin layer 16 and base material 15 being equal to or higher than this lower limit, adhesiveness between resin layer 16 and base material 15 may be further enhanced. As described above, the peel strength has a correlation with the extent of crosslinking in the fluororesin. When the peel strength is equal to or higher than this lower limit, it indicates that sufficient crosslinking is formed in the fluororesin to further enhance chemical resistance and heat resistance. Preferably, the upper limit to the peel strength is 100 N/cm, more preferably 80 N/cm. When the peel strength between resin layer 16 and base material 15 does not exceed this upper limit, the extent of crosslinking falls within a range that is appropriate for enhancing thermal bonding properties.

Preferably, the lower limit to the content of the fluororesin in resin layer 16 is 50 mass %, more preferably 70 mass %, further preferably 90 mass %, optionally particularly preferably 99 mass %. With the content of the fluororesin in resin layer 16 being equal to or higher than this lower limit, chemical resistance and heat resistance may be further enhanced. The content of the fluororesin in resin layer 16 may be 100 mass %, but in the configuration in which resin layer 16 contains a cloth or a filler described below, it is preferable that the content of the fluororesin relative to the total content of all the components except the cloth and the filler in resin layer 16 be equal to or higher than this lower limit.

Preferably, resin layer 16 contains a cloth or a filler. The cloth may be defined as, for example, a piece of woven article made of fibers or fabric. Examples of the cloth include a resin cloth, a metal cloth, a ceramic, a glass cloth, and an LCP cloth, and preferable among these are an LCP cloth and a glass cloth. Examples of the filler include a resin filler, a metal filler, a ceramic filler, and a glass filler. With resin layer 16 thus containing the cloth and/or the filler, more preferably with resin layer 16 containing the cloth, heat resistance and tensile strength may be enhanced, for instance. When resin layer 16 contains the cloth, resin layer 16 may be formed by impregnating the cloth with the fluororesin.

The content by percentage of the cloth or the filler in resin layer 16 may range from 10 mass % to 90 mass %, for example. The average thickness of the cloth, when contained, relative to the average thickness of resin layer 16 may range from 10% to 90%.

Examples of the additional component that may be contained in resin layer 16 include a resin other than the crosslinked fluororesin, a coupling agent, a flame retardant, an antioxidant, and a plasticizer. Examples of the resin other than the crosslinked fluororesin include thermoplastic resins such as polyethylene and polypropylene.

The upper limit to the linear thermal expansion coefficient of resin layer 16 may be, for example, $200\times10^{-6}$/K, preferably $40\times10^{-6}$/K, more preferably $30\times10^{-6}$/K. With the linear thermal expansion coefficient of resin layer 16 being thus low, the peel strength and the like may be enhanced. This is because the difference in thermal expansion coefficient between resin layer 16 and base material 15 mainly composed of a metal is reduced. The linear thermal expansion coefficient of aluminum is $24\times10^{-6}$/K, and the linear thermal expansion coefficient of copper is $17\times10^{-6}$/K. The linear thermal expansion coefficient of resin layer 16 may be reduced when, for instance, resin layer 16 contains the cloth and/or the filler. The lower limit to the linear thermal expansion coefficient of resin layer 16 may be $10\times10^{-6}$/K, for example. Preferably, the lower limit to the linear thermal expansion coefficient of resin layer 16 is $1\times10^{-7}$/K. When the linear thermal expansion coefficient of resin layer 16 is lower than $1\times10^{-7}$/K, workability of resin layer 16 may be impaired. This impairment may occur due to an increased difference in linear thermal expansion coefficient between base material 15 mainly composed of a metal and resin layer 16.

The average thickness of resin layer 16 is not particularly limited and may range, for example, from 1 µm to 200 µm. With the average thickness of resin layer 16 being within this range, sufficient levels of thermal bonding properties and electrically insulating properties, for instance, may be ensured.

For instance, outer layer 17 functions as a protective layer for protecting an exterior side of base material 15. Typically, outer layer 17 is mainly composed of a resin. Examples of this resin in outer layer 17 include polyethylene terephthalate (PET) and polyamide. The resin in outer layer 17 may be a resin having a melting point higher than the melting point of the crosslinked fluororesin contained in resin layer 16.

(Tab Lead 12, 12')

Tab lead 12, 12' that is an embodiment of the electricity storage device member according to the present invention includes a base material 18 and a resin layer 19 stacked on base material 18, as illustrated in FIG. 2.

Base material 18 has a belt-like shape. Typically, base material 18 is a metal foil. More specifically, base material 18 is mainly composed of a metal. Preferably, base material 18 forming tab lead 12 which is for the positive electrode is made of aluminum or aluminum alloy. Tab lead 12 which is for the positive electrode may experience a high electric potential, but when base material 18 is thus made of aluminum or aluminum alloy, dissolution of base material 18 into the electrolyte solution may be mitigated. As base material 18 forming tab lead 12' which is for the negative electrode, copper, nickel, aluminum, and an alloy of these may be suitable. Base material 18 may consist essentially of metal but may contain, for example, an additive that is not a metal. The structure of tab lead 12 which is for the positive electrode may be the same as the structure of tab lead 12' which is for the negative electrode except the suitable material of base material 18 to be used.

The size of base material 18 is not particularly limited and is selected, as appropriate, in accordance with the size and application of secondary battery 10. The average thickness of base material 18 may range from 0.05 mm to 0.5 mm, for example. The length of base material 18 may range from 20 mm to 100 mm, for example. The width of base material 18 may range from 2 mm to 80 mm. The width of base material 18 may be longer than the length of base material 18.

The ten-point average roughness ($R_z$) of base material 18 at its central portion in a longitudinal direction, in other words, in a region on which resin layer 19 is stacked may be the same as the above-described corresponding value of base material 15 of housing 11.

Neither of the end portions of base material 18, more specifically, neither one end 18a nor the other end 18b of base material 18 has resin layer 19 stacked thereon. One end 18a of base material 18 is exposed from housing 11. The other end 18b of base material 18 of tab lead 12 which is for the positive electrode is connected to the positive electrode (not illustrated) via a lead wire 14. In the same manner, the other end 18b of base material 18 of tab lead 12' which is for the negative electrode is connected to the negative electrode (not illustrated) via lead wire 14.

Resin layer 19 covers the entire central portion, which is a portion central in a longitudinal direction, of base material 18 having a belt-like shape. More specifically, resin layer 19 is stacked on the central portion of base material 18 not only on both surfaces but also on both side faces. Resin layer 19 is directly stacked on base material 18. Resin layer 19 contains a crosslinked fluororesin. Resin layer 19 may contain an additional, optional component, in addition to the fluororesin. Resin layer 19 is a thermal bonding layer having thermal bonding properties.

The crosslinked fluororesin contained in resin layer 19 is the same as the above-described crosslinked fluororesin contained in resin layer 16 of housing 11. Preferably, in the same manner as with housing 11, a chemical bond is present between the crosslinked fluororesin contained in resin layer 19 of tab lead 12, 12' and a surface of base material 18 of tab lead 12, 12'. In addition, a preferable configuration of resin layer 19 and a preferable configuration of the relationship between resin layer 19 and base material 18 are also the same as the above-described preferable configuration of resin layer 16 of housing 11 and the above-described preferable configuration of the relationship between resin layer 16 and base material 15.

The average thickness of resin layer 19 of tab lead 12, 12' may range from 1 μm to 200 μm, for example. With the average thickness of resin layer 19 being within this range, sufficient levels of thermal bonding properties and electrically insulating properties, for instance, may be ensured.

In secondary battery 10, as described above, one end of tab lead 12, 12', more specifically, one end 18a of base material 18 is disposed to be exposed from housing 11 and is sealed by housing 11. More specifically, tab lead 12, 12' is disposed in such a way that resin layer 16 of housing 11 is in direct contact with resin layer 19 of tab lead 12, 12'. With tab lead 12, 12' being disposed in this way, resin layers 16 of housing 11 are thermally bonded to one another at seal portions 13 and each resin layer 16 of housing 11 is thermally bonded to resin layer 19 of tab lead 12, 12'. This configuration is capable of hermetically enclosing, within housing 11, the stacked electrode group composed of the positive electrode, the negative electrode, and the separator immersed in the electrolyte solution.

(Advantages)

In secondary battery 10, both resin layer 16 of housing 11 and resin layer 19 of tab lead 12, 12' contain crosslinked fluororesins, respectively, and therefore have good heat resistance, good flame retardancy, and good chemical resistance. In addition, both of these resin layers have high adhesiveness with the base material. Furthermore, both resin layer 16 and resin layer 19, which are to be subjected to thermal bonding, have excellent thermal bonding properties because both of them respectively contain fluororesins, more specifically, resins of the same type. For these reasons, in secondary battery 10 including housing 11 and tab lead 12, 12', a liquid leakage is mitigated even in harsh environments and thereby excellent safety is ensured. Secondary battery 10 including housing 11 and tab lead 12, 12' may be used in the same applications as those for conventional electricity storage devices and may be particularly suitable in applications with high currents and high voltages, including such applications as electricity storage devices for electric vehicles.

<Method of Manufacturing Electricity Storage Device Member (Housing 11 and Tab Lead 12, 12')>

A method of manufacturing an electricity storage device member according to an embodiment of the present invention includes:

stacking a layer containing a fluororesin on a base material mainly composed of a metal; and applying ionizing radiation to the layer containing a fluororesin.

The ionizing radiation causes crosslinking in the fluororesin to form a resin layer. In other words, this manufacturing method is suitable for manufacturing housing 11 and tab lead 12, 12' of secondary battery 10 described above.

(Stacking Step)

The stacking step involves stacking a layer containing a fluororesin on a base material. The stacking may be carried out by, for example, a technique that involves forming a layer containing an essentially-non-crosslinked fluororesin by melt extrusion and simultaneously stacking the layer on a surface of the base material or a technique that involves laminating a layer containing an essentially-non-crosslinked fluororesin together with the base material. Alternatively, powder coating with the use of fluororesin powder may be employed for stacking a layer containing a fluororesin.

(Irradiation Step)

The irradiation step is carried out by applying ionizing radiation to a stacked body composed of the base material and the layer containing a fluororesin, more specifically by applying ionizing radiation to a surface of the layer containing a fluororesin. In the configuration in which a resin layer is formed only on one side, like in the case of housing 11, application of ionizing radiation may be performed only on that side. In the configuration in which a resin layer is formed on the entire circumference, like in the case of tab lead 12, application of ionizing radiation is performed on the entire circumference.

The application of ionizing radiation is performed to the stacked body that is placed in an oxygen-free atmosphere, more specifically, in an atmosphere with an oxygen concentration equal to or lower than 100 ppm and that has its fluororesin in a melted state. By this procedure, a crosslink is formed in the fluororesin and a chemical bond is formed between the fluororesin and the base material.

More preferably, the oxygen-free atmosphere has an oxygen concentration equal to or lower than 10 ppm. When the oxygen concentration is too high, the main chain of the fluororesin may be cut upon the ionizing radiation application. Preferably, the temperature for melting the fluororesin is higher than the melting point of the fluororesin and the difference in temperature is not smaller than 0° C. and smaller than 30° C. When the fluororesin is heated to a temperature higher than the melting point by 30° C. or greater, thermal degradation of the fluororesin may be promoted to impair material properties. Examples of the technique for lowering the oxygen concentration include using an inert gas such as nitrogen or creating vacuum.

Examples of the ionizing radiation that may be used include a γ ray, an electron beam, an X-ray, a neutron beam, and a high-energy ion beam. Preferably, the dose of the ionizing radiation ranges from 0.01 kGy to 2000 kGy, more preferably from 1 kGy to 500 kGy. When the dose of the radiation is lower than the lower limit, crosslinking reaction in the fluororesin may fail to proceed sufficiently. In contrast, when the dose of the radiation is higher than the upper limit, the fluororesin may readily degrade and crosslinking reaction may proceed excessively to impair thermal bonding properties.

The process of manufacturing housing 11 includes stacking outer layer 17 on one side of base material 15. This stacking may be carried out by a known method, such as lamination. The outer layer may be stacked either before the irradiation step or after the irradiation step.

Second Embodiment: Electricity Storage Device Member (Tab Lead 22)

Figure 3:
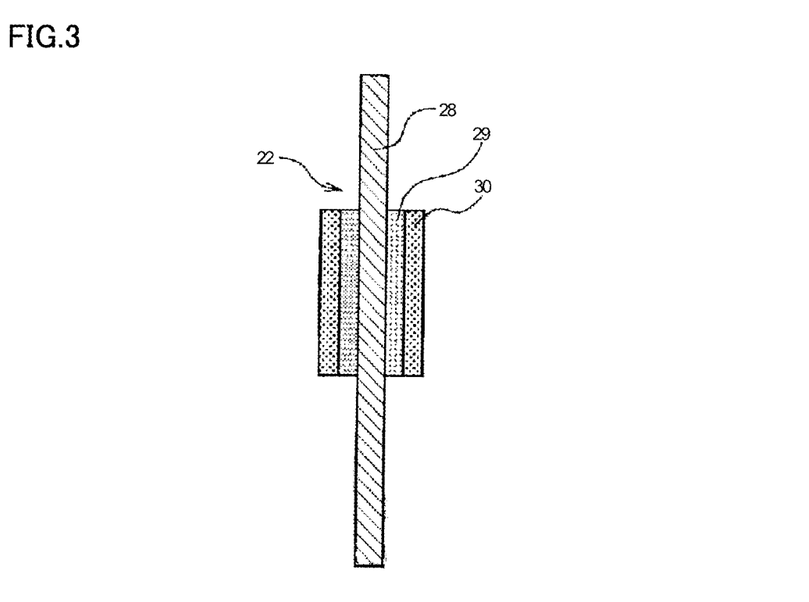
FIG. 3 is a partial sectional view of a tab lead according to a second embodiment of the electricity storage device member according to the present invention.

A tab lead 22 as a second embodiment illustrated in FIG. 3 includes a base material 28, a resin layer 29 stacked on base material 28, and a covering layer 30 stacked on resin layer 29. Base material 28 is the same as base material 18 of tab lead 12, 12' of secondary battery 10 illustrated in FIG. 2.

On base material 28, resin layer 29 and covering layer 30 are stacked in this order. In other words, covering layer 30 is stacked on resin layer 29 opposite base material 28. Tab lead 22 is different from tab lead 12, 12' illustrated in FIG. 2 in that covering layer 30 is additionally stacked on resin layer 29.

Resin layer 29 is directly stacked on base material 28. Resin layer 29 is a layer containing a crosslinked fluororesin. As resin layer 29, resin layer 19 of tab lead 12, 12' illustrated in FIG. 2 may be used as it is.

Covering layer 30 is directly stacked on an exterior side of resin layer 29. Covering layer 30 contains a fluororesin. The fluororesin thus contained in covering layer 30 is either a non-crosslinked fluororesin or a fluororesin having a melting point lower than a melting point of the crosslinked fluororesin in resin layer 29. Examples of the fluororesin having a melting point lower than a melting point of the crosslinked fluororesin include a fluororesin with no crosslinking treatment applied thereto. Specific examples include FEP, PFA, PTFE, and TFE/PDD with no crosslinking treatment applied thereto, in other words, having essentially no crosslinked structure. FEP and PFA are preferable, and FEP is more preferable. Preferably, the melting point of the fluororesin ranges from 250° C. to 350° C., for example.

Preferably, the lower limit to the content of the fluororesin in covering layer 30 is 50 mass %, more preferably 70 mass %, further preferably 90 mass %, optionally particularly preferably 99 mass %. The content of the fluororesin in covering layer 30 may be 100 mass %. The average thickness of covering layer 30 may range from 1 μm to 200 μm, for example.

For instance, stacking covering layer 30 may be carried out by lamination, on resin layer 29, of a film or a sheet containing either a non-crosslinked fluororesin or a fluororesin having a melting point lower than a melting point of the crosslinked fluororesin.

Covering layer 30 of tab lead 22 readily softens or melts upon heating compared to resin layer 29 containing a crosslinked fluororesin and, in addition, is well thermally bonded to the layer containing the fluororesin. In other words, covering layer 30 functions as a good thermal bonding layer. Therefore, when tab lead 22 is used instead of tab lead 12 in, for example, secondary battery 10 illustrated in FIG. 2, thermal bonding between tab lead 22 and housing 11 may be further enhanced. Furthermore, because covering layer 30 is a layer containing a fluororesin, good chemical resistance, good flame retardancy, good heat resistance, and the like are ensured.

Third Embodiment: Secondary Battery 40

Figure 4:
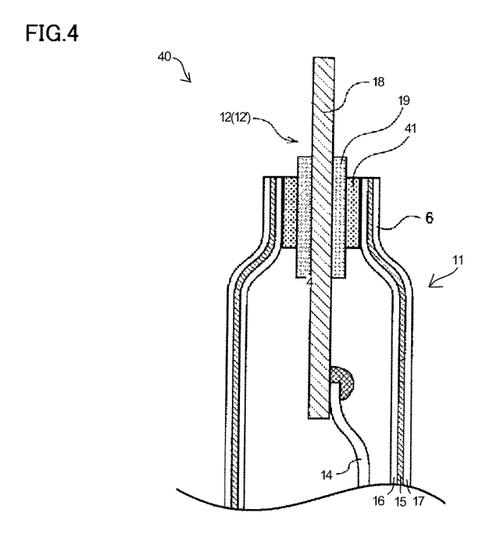
FIG. 4 is a partial sectional view of a secondary battery according to a third embodiment of the electricity storage device according to the present invention.

A secondary battery 40 as a third embodiment, illustrated in FIG. 4, includes a thermal bonding film 41 interposed between housing 11 and tab lead 12. Except it includes thermal bonding film 41, secondary battery 40 is the same as the above-described secondary battery 10 illustrated in FIGS. 1, 2. Therefore, the same numerals as those for secondary battery 10 are used except thermal bonding film 41 with an overlapping description omitted.

Thermal bonding film 41 contains either a non-crosslinked fluororesin or a fluororesin having a melting point lower than a melting point of the crosslinked fluororesin contained in resin layer 16, 19. This type of fluororesin film may be used as thermal bonding film 41. Examples of the fluororesin having a melting point lower than a melting point of the crosslinked fluororesin include the non-crosslinked fluororesins described above as examples of the fluororesin contained in covering layer 30 of tab lead 22 according to the second embodiment.

Thermal bonding film 41 readily softens upon heating compared to resin layer 16, 19 containing a crosslinked fluororesin and, in addition, is well thermally bonded to resin layer 16, 19. Therefore, in secondary battery 40, thermal bonding between tab lead 12 and housing 11 may be further enhanced. Furthermore, because thermal bonding film 41 contains a fluororesin, good chemical resistance, good flame retardancy, good heat resistance, and the like are ensured.

Other Embodiments

It should be construed that the embodiments disclosed herein are given by way of illustration in all respects, not by way of limitation. It is intended that the scope of the present invention is defined by claims, not limited by the configurations of the embodiments described above, and encompasses all modifications and variations equivalent in meaning and scope to the claims.

For instance, the above description of the embodiments takes a secondary battery as an example electricity storage device, but the present invention may be implemented for electricity storage devices other than secondary batteries. Examples of the electricity storage devices other than secondary batteries include electric double-layer capacitors.

In the secondary batteries according to the above-described embodiments, both the housing and the tab lead are the electricity storage device member according to the present invention. However, one of the housing and the tab lead may be a conventional one. In other words, the resin layer of one of the housing and the tab lead may be devoid of a crosslinked fluororesin. In this case, this resin layer may be made of a known thermoplastic resin such as non-crosslinked fluororesin, polyolefin, polyphenylene sulfide, and/or polyether ether ketone. As an alternative configuration, a covering layer may be stacked on a surface of the resin layer of the housing. Moreover, the electricity storage device member according to the present invention may further include a layer other than any of the base material, the resin layer, and the covering layer.

The electricity storage device member according to the present invention is not limited to the housing and the tab lead. For instance, the electricity storage device member according to the present invention may be used as a packing of an electricity storage device.

EXAMPLES

Next, a more detailed description will be given of the present invention with reference to examples. However, the present invention is not limited to the following examples.

Example 1

As the base material, an aluminum foil (A1085, with a thickness of 50 μm) was prepared. The ten-point average roughness (Rz) of a surface of the base material was 1 μm. To the base material, FEP was applied to form a film with an average film thickness of 50 μm. Then, in a nitrogen atmosphere at 300° C. with an oxygen concentration of 10 ppm or lower, ionizing radiation of 300 kGy was applied to FEP on the base material to form crosslinks in FEP. Then, on a surface of the resulting crosslinked FEP layer, a non-crosslinked FEP film with an average film thickness of 12 μm was stacked. This stacking was carried out by thermal bonding at a temperature of 280° C. and a pressure of 10 MPa for a holding duration of 30 minutes. Thus, a member of Example 1 having a (base material (aluminum))/(resin layer (crosslinked FEP))/(covering layer (non-crosslinked FEP)) structure was obtained. For assessment purposes, the same resin layer was separately prepared in the form of monolayer. The same applied to other examples and comparative examples.

Photoelectron spectrophotometry was carried out on the aluminum-fluororesin interface using a hard X-ray. The relationship between the bound energy and the photoelectron intensity was assessed at a measurement angle of 80°. As a result, a C—C bond at 285 eV, a $CF_2$ bond at 291 eV, and, in addition, a C—O—Al bond at 287 eV were observed. The photoelectron intensity of the C—O—Al bond was higher than that of the $CF_2$ bond. In contrast, no C—O—Al bond was observed when a resin alone was assessed or when the aluminum was coated with the fluororesin and the same heating conditions as above were used except no ionizing radiation application was performed. Based on these results, it was estimated that the radiation application and cross-linking process made the aluminum and the fluororesin be bonded to each other via a covalent bond. Also in other examples, a C—O—Al bond was observed in the same manner.

Example 2

A member of Example 2 was obtained in the same manner as in Example 1 except that the resin layer was a layer of FEP with an average film thickness of 50 μm containing a glass cloth (IPC Standards style #1015, with an average thickness of 15 μm) in the central portion thereof. In other words, the resin layer of Example 2 was a layer of glass cloth impregnated with FEP.

Example 3

A member of Example 3 was obtained in the same manner as in Example 1 except that no covering layer (non-crosslinked FEP) was stacked.

Example 4

A member of Example 4 was obtained in the same manner as in Example 3 except that the base material was a copper plate (C1020, with a thickness of 500 μm) with a ten-point average roughness (Rz) of its surface of 3 μm and that the resin layer was made of crosslinked PFA instead of crosslinked FEP.

Example 5

A member of Example 5 was obtained in the same manner as in Example 3 except that the base material was an aluminum plate (A1050, with a thickness of 500 μm) with a ten-point average roughness (Rz) of its surface of 2 μm and that the resin layer was made of crosslinked PTFE instead of crosslinked FEP.

Example 6

A member of Example 6 was obtained in the same manner as in Example 3 except that the base material was a nickel foil (rolled foil, 99.9% nickel, with a thickness of 20 μm) with a ten-point average roughness (Rz) of its surface of 1 μm.

Comparative Example 1

The same procedure as in Example 1 was carried out except that no ionizing radiation application was performed for FEP on the base material. A single-piece member composed of the resin layer and the base material was not obtained.

Comparative Example 2

A polypropylene resin layer was stacked on the base material used in Example 1, with the use of maleic-anhydride-modified polypropylene as an adhesive. Thus, a member of Comparative Example 2 was obtained.

[Evaluation]
(Linear Thermal Expansion Coefficient, Tensile Strength at Break, and Flame Retardancy)

Each of the resin layers obtained in the examples and the comparative examples was subjected to measurement for linear thermal expansion coefficient and tensile strength at break. Table 1 illustrates the measurement results and the flammability classification of the resin used in the resin layer according to UL94 Standards.

(Peel Strength)

A member obtained in the above manner was put on another member obtained in the above manner, with their outermost layers being in contact with each other. To the resultant, a load was applied at 320° C. and 1 kgf for 10 seconds for thermal bonding. In the configuration in which a covering layer made of non-crosslinked FEP and/or the like was stacked, the outermost layer refers to the covering layer, whereas in the configuration in which no covering layer was stacked, the outermost layer refers to a resin layer made of crosslinked FEP and/or the like. The thermally bonded members were subjected to measurement for peel strength at a peeling speed of 50 mm/min. Measurement results are illustrated in Table 1. Table 1 also specifies the mating member used in the thermal bonding. In Example 3, thermal bonding did not occur in 10 seconds and therefore the load application was continued for three minutes to achieve thermal bonding. However, this thermal bonding duration was too long and thereby caused heat deformation of part of the surface.

(Heat Resistance)

Heat resistance was evaluated by assessing the presence of peeling on each thermally bonded member after the member was left at a high temperature of 150° C. for 30 minutes. A sample without peeling was rated as "A", and a sample with peeling was rated as "B". These evaluation results are illustrated in Table 1.

TABLE 1

|  |  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Structure | Covering layer | Non-crosslinked FEP | Non-crosslinked FEP | — | — | — | — | — | PP |
|  | Resin layer | Crosslinked FEP (without glass) | Crosslinked FEP (with glass) | Crosslinked FEP (without glass) | Crosslinked PFA (without glass) | Crosslinked PTFE (without glass) | Crosslinked FEP (without glass) | Non-crosslinked FEP (without glass) | Maleic-anhydride-modified PP |
|  | Base material | Aluminum (Rz: 1 μm) | Aluminum (Rz: 1 μm) | Aluminum (Rz: 1 μm) | Copper (Rz: 3 μm) | Aluminum (Rz: 2 μm) | Nickel (Rz: 1 μm) | Aluminum (Rz: 1 μm) | Aluminum (Rz: 1 μm) |
| Thermal bonding mating member | | Ex. 1 | Ex. 2 | Ex. 3 | Ex. 2 | Ex. 2 | Ex. 2 | — | Comp. Ex. 2 |
| [Evaluation] | | | | | | | | | |

TABLE 1-continued

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Linear thermal expansion coefficient ($\times 10^{-6}$/K) | 90 | 25 | 25 | 100 | 25 | 90 | 90 | 120 |
| Tensile strength at break (Mpa) | 25 | 70 | 25 | 27 | 28 | 25 | 24 | 20 |
| Peel strength (N/cm) | 3 | 20 | 0.5 | 32 | 27 | 9 | — | 10 |
| Flame retardancy (UL94) | V0 | V0 | V0 | V0 | V0 | V0 | V0 | Flammable |
| Heat resistance: measured after left at 150° C. | A | A | A | A | A | A | — | B |

As illustrated in Table 1, each of the members of Examples 1 to 6 was found to have good heat resistance and good flame retardancy.

INDUSTRIAL APPLICABILITY

As described above, the electricity storage device member according to the present invention may be suitable for use as a tab lead, a housing, and the like of an electricity storage device such as a secondary battery and a capacitor.

REFERENCE SIGNS LIST 10, 40 secondary battery; 11 housing; 12, 12', 22 tab lead; 13 seal portion; 14 lead wire; 15 base material; 16 resin layer, 17 outer layer, 18, 28 base material; 18a one end; 18b the other end; 19, 29 resin layer; 30 covering layer, 41 thermal bonding film

The invention claimed is:

1. An electricity storage device member, comprising:
a base material mainly composed of a metal;
a resin layer stacked on the base material, the resin layer containing a crosslinked fluororesin; and
a covering layer containing a fluororesin,
wherein the covering layer is stacked on the resin layer opposite the base material, and
wherein the fluororesin contained in the covering layer is either a non-crosslinked fluororesin or a fluororesin having a melting point lower than a melting point of the crosslinked fluororesin.

2. The electricity storage device member according to claim 1, wherein a chemical bond is present between the fluororesin contained in the resin layer and a surface of the base material.

3. The electricity storage device member according to claim 1, wherein the resin layer is a thermal bonding layer.

4. An electricity storage device member, comprising:
a base material mainly composed of a metal; and
a resin layer stacked on the base material, the resin layer containing a crosslinked fluororesin,
wherein the resin layer contains a cloth or a filler, and
wherein the resin layer has a linear thermal expansion coefficient ranging from $1\times 10^{-7}$/K to $40\times 10^{-6}$/K.

5. The electricity storage device member according to claim 1, wherein the crosslinked fluororesin is tetrafluoroethylene-hexafluoropropylene copolymer.

6. The electricity storage device member according to claim 1, wherein the fluororesin contained in the covering layer is tetrafluoroethylene-hexafluoropropylene copolymer.

7. The electricity storage device member according to claim 1, wherein a peel strength between the resin layer and the base material ranges from 0.1 N/cm to 100 N/cm.

8. The electricity storage device member according to claim 1, wherein a ten-point average roughness ($R_z$) of the surface of the base material in a region on which the resin layer is stacked ranges from 0.001 µm to 10 µm.

9. The electricity storage device member according to claim 1,
wherein the electricity storage device member is a tab lead or a housing.

10. The electricity storage device member according to claim 4, wherein the electricity storage device member is a tab lead or a housing.

11. An electricity storage device comprising:
a positive electrode;
a negative electrode;
an electrolyte solution;
a housing accommodating the positive electrode, the negative electrode, and the electrolyte solution; and
a tab lead,
the tab lead having one end exposed from the housing and the other end connected to the positive electrode or the negative electrode,
the housing and the tab lead being thermally bonded to each other, and
at least one of the housing and the tab lead comprising a base material mainly composed of a metal, and a resin layer stacked on the base material, the resin layer containing a crosslinked fluororesin.

12. The electricity storage device according to claim 11, further comprising a thermal bonding film interposed between the housing and the tab lead,
wherein the thermal bonding film contains a non-crosslinked fluororesin or a fluororesin having a melting point lower than a melting point of the crosslinked fluororesin.

* * * * *